(12) United States Patent
Wolf-Monheim

(10) Patent No.: US 10,864,789 B2
(45) Date of Patent: Dec. 15, 2020

(54) VEHICLE REAR WHEEL SUSPENSION WITH TRACK CONTROL

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 92 days.

(21) Appl. No.: 16/263,205

(22) Filed: Jan. 31, 2019

(65) Prior Publication Data

US 2019/0241035 A1    Aug. 8, 2019

(30) Foreign Application Priority Data

Feb. 5, 2018 (DE) .................. 10 2018 201 670

(51) Int. Cl.
*B60G 7/00* (2006.01)
*B60G 3/06* (2006.01)

(52) U.S. Cl.
CPC ............. *B60G 7/003* (2013.01); *B60G 3/06* (2013.01); *B60G 7/006* (2013.01); *B60G 2200/1322* (2013.01); *B60G 2200/142* (2013.01); *B60G 2200/32* (2013.01); *B60G 2200/462* (2013.01); *B60G 2200/4622* (2013.01); *B60G 2204/41* (2013.01); *B60G 2204/62* (2013.01)

(58) Field of Classification Search
CPC .......... B60G 7/003; B60G 7/006; B60G 3/06; B60G 2200/462; B60G 2200/4622; B60G 2200/1322; B60G 2200/142; B60G 2200/32; B60G 2204/41; B60G 2204/62; B60G 3/02; B60G 2200/10; B62D 7/146; B62D 17/00

See application file for complete search history.

(56) References Cited

U.S. PATENT DOCUMENTS

| | | | |
|---|---|---|---|
| 4,537,420 A * | 8/1985 | Ito ........................... | B60G 3/26 280/124.128 |
| 4,709,935 A * | 12/1987 | Takizawa ............... | B60G 3/202 180/414 |
| 2004/0046347 A1* | 3/2004 | Lee ........................ | B60G 7/001 280/124.128 |

(Continued)

FOREIGN PATENT DOCUMENTS

| | | |
|---|---|---|
| DE | 10244140 A1 | 4/2004 |
| DE | 102006055294 A1 | 5/2008 |
| DE | 102006055288 A1 | 6/2008 |

(Continued)

*Primary Examiner* — Drew J Brown
(74) *Attorney, Agent, or Firm* — Ray Coppiellie; Bejin Bieneman PLC

(57) ABSTRACT

An independent wheel suspension of a rear wheel of a motor vehicle, includes a control arm and a controllable actuator. The control arm is able to be articulated to a chassis of the motor vehicle and is able to be connected to a wheel carrier. The actuator is able to be fastened to the chassis and is able to be operatively connected to a front outer end of the control arm. According to the disclosure, when the actuator is controlled, said actuator is provided to carry out a length alteration which is substantially aligned in a direction parallel to a straight-ahead direction of travel.

20 Claims, 1 Drawing Sheet

(56) References Cited

U.S. PATENT DOCUMENTS

2005/0029770 A1* 2/2005 Kim ..................... B60G 7/006
                                                280/124.128
2018/0201319 A1* 7/2018 Rogers .................. B62D 17/00

FOREIGN PATENT DOCUMENTS

| DE | 102011007283 | A1 |   | 10/2012 |           |
|----|--------------|----|---|---------|-----------|
| DE | 102015202209 | A1 |   | 8/2016  |           |
| DE | 202014010790 | U1 |   | 8/2016  |           |
| EP | 1939073      | A2 |   | 7/2008  |           |
| JP | 06344737     | A  | * | 12/1994 | ............. B60G 7/003 |

* cited by examiner

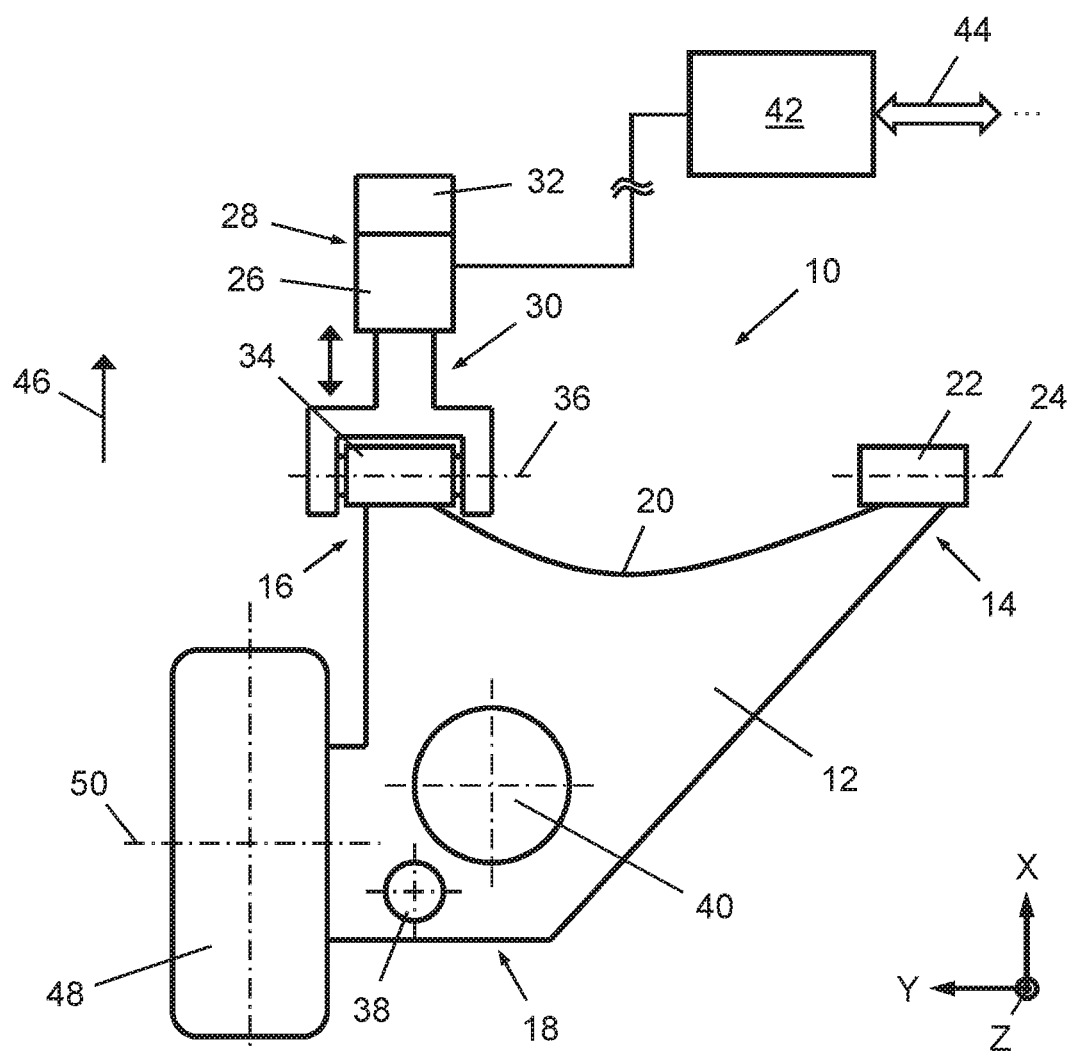

VEHICLE REAR WHEEL SUSPENSION WITH TRACK CONTROL

CROSS-REFERENCE TO RELATED APPLICATION

This patent application claims priority to and all benefits of German Application No. DE 102018201670.4 filed on Feb. 5, 2018, which is hereby incorporated by reference in its entirety.

FIELD OF THE DISCLOSURE

The disclosure relates to an independent wheel suspension of a rear wheel of a motor vehicle comprising a control arm and a controllable actuator operatively connected to the control arm. The disclosure further relates to the motor vehicle comprising such a right-hand and a left-hand independent wheel suspension.

BACKGROUND

In the field of vehicle technology, very different types of suspension for the wheels of a motor vehicle are known in the prior art. Nowadays, primarily independent wheel suspensions are used in passenger motor vehicles, in which the two opposing wheels of an axle may be deflected independently of one another.

Independent wheel suspensions for the rear wheels of the motor vehicle are known from the prior art, a track adjustment of the individual rear wheel being permitted thereby, by using controllable actuators. As a result, for example, a turning circle of the motor vehicle may be advantageously reduced. In particular, in driving maneuvers at low speed, namely when maneuvering in and out of a parking space, the additional rear wheel steering provides improvements relative to the driving comfort and the mobility of the motor vehicle.

Various embodiments are known in the prior art, in which the actuator is operatively arranged between a wheel carrier and a control arm of a wheel suspension of the vehicle.

For example, DE 10 2011 007 283 A1 discloses an independent wheel suspension for a rear wheel of a double-track vehicle which can be steered by means of an actuator. A wheel carrier thereof being guided by a trailing arm extending in a vehicle longitudinal direction and two transverse control arms extending in a cross-vehicle direction and located at different height planes. The transverse control arms are fastened to the wheel carrier by means of a bolt or the like via a rubber bearing or a joint having at least a minimal degree of rotational freedom. By means of these two bolts, the trailing arm is also mounted on the wheel carrier, in each case via a rubber bearing or a joint having at least a minimal degree of rotational freedom, such that the wheel carrier is at least minimally pivotable relative to the trailing arm about a pivot axis which extends substantially in the vertical direction and which is formed by these rubber bearings or joints. This degree of rotational freedom of the wheel carrier, thus formed, is limited by a tie rod element which is articulated to the wheel carrier and which is displaceable at least partially in the cross-vehicle direction by means of an actuator-adjusting element. The actuator-adjusting element is arranged between the trailing arm and the tie rod element.

An independent wheel suspension for a motor vehicle with active track adjustment is proposed in DE 10 2006 055 294 A1. In the independent wheel suspension, a wheel control arm which is configured as an H-shaped control arm is articulated on a wheel carrier at a point of articulation by means of a control arm bearing. In this case, the control arm bearing is provided with an adjusting mechanism which is actuatable by an actuator, a relative spacing between the point of articulation of the wheel control arm and the wheel carrier being adjustable thereby in the cross-vehicle direction.

EP 1 939 072 A2 describes a passenger motor vehicle which in addition to steerable front wheels comprises at least one pair of steerable rear wheels, wherein the rear wheels are designed to provide additional steering in order to complement the steering of the front wheels by an angular movement of the rear wheels from a straight-ahead position. The passenger motor vehicle further comprises a vehicle body with a front and a rear, as well as a rear suspension arrangement which comprises a left-hand and a right-hand suspension subassembly as well as front wheels and rear wheels, wherein each of the rear suspension subassemblies in each case carries at least one of the rear wheels.

Each suspension subassembly comprises an actuator which is connected at one point to a tie rod element of a steering knuckle and at a second point on the inside to a semi-trailing arm of the suspension subassembly. The actuator can be actuated by controlling a control means in order to produce a relative movement between the steering knuckle and the semi-trailing arm, so as to provide steering of the rear wheels relative to the vehicle body by an angle of at least 5 degrees on each side of the straight-ahead position.

Moreover, it is also known from the prior art to arrange the actuator operatively between a wheel carrier and a chassis of the vehicle.

Thus, an independent wheel suspension for motor vehicles with active track adjustment for speed-dependent track adjustment of the rear wheels is disclosed, for example, in DE 10 2006 055 288 A1. The independent wheel suspension is provided for multiple articulation of a wheel carrier on the subassembly of the vehicle body of a motor vehicle and comprises an actuator mounted on the vehicle side and an actuating member which is actuatable by the actuator and which acts on the wheel carrier such that by the actuation thereof a position of the wheel carrier can be altered relative to the vehicle longitudinal direction. The control arm is configured, for example, as an H-shaped control arm.

Additionally, a rear wheel steering mechanism for a vehicle, a correspondingly equipped vehicle and a method for operating the rear wheel steering is proposed in DE 10 2015 202 209 A1. The method provides that at least one wheel carrier is pivoted via an actuator such that a wheel coupled to the wheel carrier is aligned with regard to its alterable steering angle relative to a longitudinal direction of the vehicle. The actuator is arranged between a subframe or body of a vehicle and the wheel carrier and comprises an electric motor, the rotational movement thereof being transferred into translational movement of the actuator, serving for pivoting the wheel carrier. The rotational movement of the electric motor is converted by a non-linear transfer function into translational movement.

With regard to the prior art set forth, the field of independent wheel suspensions of the rear wheels of a motor vehicle with controllable actuators for track adjustment leaves further room for improvement.

BRIEF DESCRIPTION OF THE FIGURES

Further advantageous embodiments of the disclosure are disclosed in the claims and in the following description, in which:

FIG. 1 shows a schematic view of an independent wheel suspension of a rear wheel of a motor vehicle in an installed state in a plan view.

DETAILED DESCRIPTION

The object of the disclosure is to provide an independent wheel suspension for rear wheels of a motor vehicle that permits an effective, controllable adjustment of the track of the rear wheel, wherein the independent wheel suspension is designed at the same time to have a compact construction in order to be able to provide installation space for the other components of the motor vehicle that do not form part of a chassis. In particular, the components which do not form part of the chassis may be constituted by a rechargeable drive battery, an electric drive motor, and/or components of a power electronics system of an electric drive motor.

It should be mentioned that the features and measures set forth individually in the following description may be combined in any technically expedient manner and disclose further embodiments of the disclosure. The description characterizes and specifies the disclosure additionally in connection with the FIGURE.

The independent wheel suspension of the rear wheel of the motor vehicle comprises a control arm that can be articulated at an end on an internal and body side to the chassis of the motor vehicle and that can be connected at an end on a wheel carrier side to a wheel carrier. The independent wheel suspension further comprises a controllable actuator that can be fastened by an end on the body side to the chassis and that can be operatively connected at an end remote from the chassis to a front outer end of the control arm.

In this case, when the actuator is controlled, the actuator is provided to carry out a length alteration that is substantially aligned in a direction parallel to a straight-ahead direction of travel.

A "motor vehicle" is intended to be understood within the meaning of this disclosure as a passenger motor vehicle, a van, a truck, a semitrailer or a motor bus.

The term "operatively connected" is intended to be understood within the meaning of this disclosure that operatively connected objects are mechanically connected together such that a transmission of a force and/or a torque and/or a torsional moment is possible between the objects. The transmission in this case may take place both by direct contact and also indirectly by an intermediate element.

The term "provided" is intended to be understood within the meaning of this disclosure as specifically programmed, designed or arranged therefor.

The term "substantially parallel" is intended to be understood within the meaning of this disclosure that an absolute value of a deviation from a parallelism is less than 20°, preferably less than 15°, and particularly preferably less than 10°.

When the length alteration is carried out by the actuator, the control arm is pivoted about its end on the internal and body side, and the track of the rear wheel is altered.

Due to the proposed arrangement of the actuator on the front outer end of the control arm, a compact design of the independent wheel suspension of the rear wheel is possible, resulting in internal installation space being able to be saved and assigned to other components that do not form part of the chassis. For example, the saved internal installation space may be used for a rechargeable battery or by a fuel cell stack as the energy source of an electric drive of the motor vehicle, whereby limitations to the installation space for receiving the electrical energy source with regard to shape and size may be at least reduced by components of the suspension of the rear wheels.

Additionally, in the proposed independent wheel suspension it may be advantageously ensured that the length alteration is carried out by the actuator and thus a force is introduced into the control arm in a particularly effective manner, since a direction of the force introduced by the actuator into the control arm remains constant during the length alteration. Moreover, with a suitable design of the proposed independent wheel suspension, it may be achieved that by the force introduced by the actuator into the control arm a torque is exerted in a particularly effective manner on the control arm around the end on the internal and body side, so that the force required for a track adjustment of the rear wheel may be kept to a minimal level.

The direction of the length alteration carried out by the actuator is constant; in other words, the actuator is provided to carry out a linear length alteration parallel to the straight-ahead direction of travel in an entirely predetermined region.

In an exemplary embodiment of the independent wheel suspension, positions of articulation of the end on the internal and body side and of the front outer end of the control arm are spaced apart from one another in a direction transverse to the straight-ahead direction of travel and can be arranged in the straight-ahead direction of travel at the same spacing relative to and upstream of a rotational axis of the rear wheel. In this manner, with a compact design of the independent wheel suspension, advantageous lever ratios may be achieved for introducing the force into the control arm by means of the actuator.

The controllable actuator is an electrically or pneumatically controllable actuator. Such actuators are available commercially and are compatible with the energy sources generally available in motor vehicles for the control, so that controllable actuators may be provided in a simple manner. The controllable actuator is an electrically or pneumatically controllable linear actuator.

In an exemplary embodiment of the independent wheel suspension, the control arm is substantially triangular shape, wherein the end on the internal and body side and the front outer end of the control arm form two corners of the triangular shape. In this manner, a compact and lightweight design of the independent wheel suspension may be achieved with sufficient stability.

An elastomer bearing bush may be provided for the articulation of the end of the control arm on the internal and body side and/or for the articulation of the front outer end of the control arm. In this manner, a structurally simple articulation of the control arm may be provided on the chassis and/or on the controllable actuator. The elastomer bearing bushes may provide in a simple manner a predetermined pivoting region for a movement of the control arm as a result of the length alteration carried out by the actuator.

Pivot axes of the bearing bushes are transverse to the straight-ahead direction of travel.

Alternatively, a ball joint may be provided for the articulation of the end on the internal and body side and/or the front outer end of the control arm, whereby an articulation may be achieved without play.

The end of the actuator remote from the chassis is fork-shaped and, for the articulation on the front outer end of the control arm, an elastomer bearing bush may be received in the end of the actuator which is fork-shaped. As a result, a pivotable operative connection may be provided in a simple manner between the end of the actuator remote from the chassis and the front outer end of the control arm.

Means for attaching a damping element are provided at the end of the control arm on the wheel carrier side. By the attachment of the damping element implemented in this manner, an effective damping of excited vibrations may be achieved. Preferably, the damping elements are configured as shock absorbers. Moreover, internal installation space may thus be saved, components not forming part of the chassis being able to be assigned thereto, as mentioned above.

Moreover, a spring seat for receiving a helical compression spring for the suspension is provided at the end of the control arm on the wheel carrier side. "Helical compression spring" is intended to be understood within the meaning of this disclosure, in particular, as a spring which is formed by a spring wire wound in a helical shape. An external shape of the helical compression spring in this case may be cylindrical, ball-shaped or barrel-shaped. By the arrangement of the helical compression spring designed in such a manner, an effective suspension may be achieved, wherein internal installation space may also be saved by the external arrangement.

In a further feature of the disclosure, the motor vehicle comprises a right-hand and a left-hand embodiment of the proposed independent wheel suspension of the rear wheel. In this case, the control arms are articulated with the end on the internal and body side on the chassis of the motor vehicle and are connected at the end on the wheel carrier side to the wheel carrier. The controllable actuators are fastened with the end on the internal and body side to the chassis and are articulated with the end remote from the chassis on the front outer end of the control arm.

The advantages described in connection with the proposed independent wheel suspension can be transferred in their entirety to such a motor vehicle.

In an exemplary embodiment of the motor vehicle, an electrical or electronic control unit is provided for controlling the controllable actuators, wherein the control unit is connected in terms of functional technology to a steering unit of the motor vehicle. For example, the functional-technical connection may include the control unit receiving, by means of a data-systems connection, data and/or instruction signals from an electronic vehicle control unit which is provided, amongst other things, for detecting a steering angle lock and a vehicle speed. The data-systems connection may be wireless and/or wired.

FIG. 1 shows a schematic view of one possible embodiment of the independent wheel suspension 10 of the rear wheel of the motor vehicle in a plan view. By way of example, the rear wheel is a left-hand rear wheel 48 of the motor vehicle. A further independent wheel suspension of a right-hand rear wheel of the motor vehicle, which is not shown in FIG. 1, is substantially a mirror image of the independent wheel suspension 10 of the left-hand rear wheel 48, so that it is sufficient to describe the independent wheel suspension by means of an independent wheel suspension 10 of the left-hand rear wheel 48.

A straight-ahead direction of travel 46 of the motor vehicle, which may be a passenger motor vehicle, faces in FIG. 1 from the lower drawing edge to the upper drawing edge, i.e. parallel to the X direction.

The independent wheel suspension 10 contains a control arm 12 that is a substantially triangular shape. The control arm 12 has an end 14 on the internal and body side, a front outer end 16 and an end 18 on the wheel carrier side. The end 14 on the internal and body side and the front outer end 16 of the control arm 12 form two corners of the triangular shape. A front edge 20, which connects the end 14 on the internal and body side and the front outer end 16 of the control arm 12, is a concave shape for the purpose of saving weight.

The control arm 12 is articulated at the end 14 on the internal and body side to a chassis (not shown) of the motor vehicle. A first elastomer bearing bush 22 may be provided for the articulation of the end 14 of the control arm 12 on the internal and body side. The first elastomer bearing bush 22 is a rubber plain bearing bush. A pivot axis 24 of the first elastomer bearing bush 22 is transverse to the straight-ahead direction of travel 46.

The end 18 of the control arm 12 on the wheel carrier side is connected in the manner known per se to a wheel carrier, which is provided for receiving the left-hand rear wheel 48 of the motor vehicle formed by a wheel-tire combination, such that the left-hand rear wheel 48 is rotatably mounted about a horizontal rotational axis 50.

The independent wheel suspension 10 further contains a controllable actuator 26, which, for example, is an electrically controllable (electromagnetic) linear actuator. The actuator 26 comprises an end 28 on the body side and an end 30 remote from the chassis. The actuator 26 is fixedly attached to the chassis by the end 28 on the body side by means of a suitable fastening element 32. The end 30 remote from the chassis is configured to be fork-shaped and is operatively connected to the front outer end 16 of the control arm 12 by a second elastomer bearing bush 34. The second elastomer bearing bush 34 is fixedly connected to the front outer end 16 of the control arm 12, and is pivotably received in the end 30 of the actuator 26 for the articulation. The second elastomer bearing bush 34 is a rubber-plain bearing bush. A pivot axis 36 of the second elastomer bearing bush 34 is transverse to the straight-ahead direction of travel 46.

In alternative embodiments, ball joints may also be used instead of the first elastomer bearing bush 22 and/or the second elastomer bearing bush 34.

The terms "first", "second", etc. which are used herein, serve merely for the purpose of differentiation. In particular, no sequence or priority of the objects cited in connection with these terms is intended to be implied by the use thereof.

Positions of articulation of the end 14 of the control arm 12 on the internal and body side and of the front outer end 16 of the control arm 12 are spaced apart from one another in a direction transverse to the straight-ahead direction of travel 46 and are arranged at the same spacing in the straight-ahead direction of travel 46 relative to and upstream of the rotational axis 50 of the rear wheel 48, so that the pivot axis 24 of the first elastomer bearing bush 22 and the pivot axis 36 of the second elastomer bearing bush 34 are aligned.

Means 38 for attaching a damper element (not shown) are provided at the end 18 of the control arm 12 on the wheel carrier side. The damper element is a conventional shock absorber. Moreover, a spring seat 40 is provided at the end 18 of the control arm 12 on the wheel carrier side for receiving a helical compression spring for the suspension (not shown).

The motor vehicle comprises an electronic control unit 42 for controlling the controllable actuator 26 of the left-hand independent wheel suspension 10 of the rear wheel 48. The electronic control unit 42 is also used for controlling the controllable actuator of the right-hand independent wheel suspension. Each controllable actuator 26 is provided and/or used, when controlled by the control unit 42, to carry out the length alteration (indicated in FIG. 1 by a double-sided arrow), which is aligned in a direction parallel to the straight-ahead direction of travel 46. When the length alteration is carried out by the actuator 26, the control arm 12 is pivoted in a corresponding manner about the end 14 on the internal and body side, whereby the track of the respective rear wheel is altered.

The electronic control unit 42 is connected in terms of functional technology to a steering unit of the motor vehicle, by receiving instruction signals from an electronic vehicle control unit (not shown) via a data-systems connection which, for example, is formed by a CAN (Controller Area Network) bus 44, which is widely available in automotive technology, wherein the electronic vehicle control unit is provided, amongst other things, for detecting a steering angle lock and a vehicle speed and determines the instruction signals from the detected variables.

The invention claimed is:

1. A vehicle, comprising:
    a chassis;
    a suspension supported by the chassis, the suspension including a rear wheel having a wheel carrier;
    the suspension including a control arm having an inner end articulated with the chassis at a pivot axis that is transverse to a direction of travel of the vehicle, the control arm having an end connected to the wheel carrier, and the control arm having a front end spaced from the inner end and the end; and
    the suspension including an actuator elongated in the direction of travel of the vehicle from an end fastened to the chassis to a remote end connected to the front end of the control arm, the actuator extendable along the direction of travel, the actuator pivots the control arm about the inner end about an axis transverse to both the pivot axis and the direction of travel when the length of the actuator along the direction of travel is altered.

2. The vehicle of claim 1, wherein the inner end and the front end of the control arm are spaced from each other in a direction transverse to the direction of travel.

3. The vehicle of claim 1, wherein the actuator is an electrical linear actuator.

4. The vehicle of claim 1, wherein the actuator is a pneumatic linear actuator.

5. The vehicle of claim 1, wherein the control arm has substantially a triangular shape, the inner end and the front end each being a corner of the triangular shape.

6. The vehicle of claim 1, further comprising at least one bearing, one bearing attached to one of the inner end and the front end of the control arm.

7. The vehicle of claim 1, further comprising a bearing attached to the remote end.

8. The vehicle of claim 1, wherein the remote end of the actuator is fork-shaped.

9. The vehicle of claim 8, further comprising a bearing received in the fork-shape of the remote end.

10. The vehicle of claim 1, further comprising a vibration dampener attached adjacent to the end of the control arm.

11. The vehicle of claim 1, further comprising a spring seat disposed adjacent the end of the control arm.

12. The vehicle of claim 1, further comprising:
    a second suspension supported by the chassis, the second suspension including a second rear wheel spaced from the rear wheel and having a second rear wheel carrier;
    the second suspension including a control arm having an inner end articulated with the chassis and an end connected to the second rear wheel carrier, the control arm having a front end spaced from the inner end and the end; and
    the second suspension system including an actuator extending in a direction of travel from an end fastened to the chassis to a remote end connected to the front end of the control arm, the actuator being extendable along the direction of travel.

13. The vehicle of claim 12, further comprising an electronic control unit having a processor and a memory storing instructions executable by the processor to extend the actuators of the suspension and the second suspension in response to a steering input.

14. The vehicle of claim 1, further comprising an electronic control unit having a processor and a memory storing instructions executable by the processor to extend the actuator in response to a steering input.

15. The vehicle of claim 1, further comprising an elastomer bearing bush at the inner end of the control arm allowing pivoting of the control arm about the inner end when the length of the actuator along the direction of travel is altered.

16. The vehicle of claim 15, further comprising a second elastomer bearing bush between the remote end of the actuator and the first end of the control arm.

17. A vehicle, comprising:
    a chassis;
    a suspension supported by the chassis, the suspension including a rear wheel having a wheel carrier;
    the suspension including a control arm having an inner end articulated with the chassis and an end connected to the wheel carrier, the control arm having a front end spaced from the inner end and the end; and
    the suspension including an actuator elongated in a direction of travel of the vehicle from an end fastened to the chassis to a remote end connected to the front end of the control arm, the actuator extendable along the direction of travel; and
    an electronic control unit having a processor and a memory storing instructions executable by the processor to extend the actuator in response to a steering input.

18. The vehicle of claim 17, wherein the inner end and the front end of the control arm are spaced from each other in a direction transverse to the direction of travel.

19. The vehicle of claim 17, wherein the actuator is an electrical linear actuator.

20. The vehicle of claim 17, wherein the actuator is a pneumatic linear actuator.

* * * * *